(12) United States Patent
Han et al.

(10) Patent No.: US 10,974,761 B2
(45) Date of Patent: Apr. 13, 2021

(54) STEERING CONTROL METHOD AND APPARATUS OF MOTOR-DRIVEN POWER STEERING SYSTEM

(71) Applicants: Hyundai Motor Company, Seoul (KR); Kia Motors Corporation, Seoul (KR)

(72) Inventors: Min Woo Han, Hwaseong-si (KR); Sun Mok Lee, Yangju-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/387,387

(22) Filed: Apr. 17, 2019

(65) Prior Publication Data

US 2020/0180680 A1 Jun. 11, 2020

(30) Foreign Application Priority Data

Dec. 11, 2018 (KR) ........................ 10-2018-0159509

(51) Int. Cl.
*B62D 5/04* (2006.01)
*B62D 6/00* (2006.01)

(52) U.S. Cl.
CPC ......... *B62D 5/0463* (2013.01); *B62D 5/0472* (2013.01); *B62D 6/008* (2013.01)

(58) Field of Classification Search
CPC .... B62D 5/0463; B62D 5/0472; B62D 6/008; B62D 5/0481
See application file for complete search history.

(56) References Cited

U.S. PATENT DOCUMENTS 8,140,222 B2 * 3/2012 Watanabe ............ B62D 5/0463
701/41
9,902,424 B2 2/2018 Oshima
(Continued)

FOREIGN PATENT DOCUMENTS

DE 10 2012 204 870 A1 10/2012
DE 10 2014 118 639 A1 7/2015
(Continued)

OTHER PUBLICATIONS

Extended European Search Report dated Dec. 19, 2019 for European Patent Application No. 19169792.9.

*Primary Examiner* — Rodney A Butler
(74) *Attorney, Agent, or Firm* — Morgan, Lewis & Bockius LLP

(57) ABSTRACT

A steering control method and apparatus of a motor-driven power steering system, ma include setting, by a controller, a virtual steering model including a reaction force apparatus provided between a steering wheel and a rack gear; inducing, by the controller, a state equation for the virtual steering model, the state equation representing momentum of the steering wheel, the reaction force apparatus, and the rack gear as state variables of the state equation; determining, by the controller, target steering torque acting in the reaction force apparatus through numerical integration of the state equation; and feedback-controlling, by the controller, a steering motor control amount to the motor-driven power steering system to bring a steering torque of the motor-driven power steering system into agreement with the target steering torque.

13 Claims, 7 Drawing Sheets

(56) References Cited

U.S. PATENT DOCUMENTS

| | | | |
|---|---|---|---|
| 2006/0086560 A1* | 4/2006 | Furusho | B62D 6/003 |
| | | | 180/446 |
| 2012/0253588 A1 | 10/2012 | Ghoneim | |
| 2014/0343794 A1* | 11/2014 | Tamaizumi | B62D 5/0472 |
| | | | 701/42 |
| 2015/0203148 A1 | 7/2015 | Kuramitsu | |
| 2015/0353124 A1 | 12/2015 | Chai et al. | |
| 2017/0183031 A1 | 6/2017 | Ko | |

FOREIGN PATENT DOCUMENTS

| | | |
|---|---|---|
| EP | 1 081 018 A2 | 3/2001 |
| EP | 2 003 040 A2 | 12/2008 |
| EP | 2 052 947 A1 | 4/2009 |
| JP | H10-16809 A | 1/1998 |
| JP | 2004-050972 A | 2/2004 |
| JP | 5994481 B2 | 9/2016 |
| KR | 10-2015-0077988 A | 7/2015 |
| KR | 10-1684513 B1 | 12/2016 |
| KR | 10-2017-0019669 A | 2/2017 |
| KR | 10-2017-0115247 A | 10/2017 |

* cited by examiner

STEERING CONTROL METHOD AND APPARATUS OF MOTOR-DRIVEN POWER STEERING SYSTEM

CROSS REFERENCE TO RELATED APPLICATION

The present application claims priority to Korean Patent Application No. 10-2018-0159509, filed Dec. 11, 2018, the entire contents of which is incorporated herein for all purposes by this reference.

BACKGROUND OF THE INVENTION

Field of the Invention

The present invention relates to steering control method and apparatus of a motor-driven power steering system, wherein a characteristic of the steering system is variously changed by use of a virtual steering model to predict steering performance, whereby development efficiency of steering control technology is improved.

Description of Related Art

As for existing open-loop motor-driven power steering (MDPS) control, performance may be changed by how hardware is distributed, and repeated tunings are required to obtain a desired target steering performance.

However, problems of the open-loop control may be overcome by closed-loop feedback control.

That is, the feedback control as a look-up table method generates and feedback-controls target steering torque as an object to be controlled, improving control robustness and tuning efficiency compared to the open-loop control.

However, as for the feedback control, in an initial stage of mapping out a feedback controller, it is difficult to predict a control logic performance. Accordingly, methods to enhance development efficiency are required.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing steering control method and apparatus of a motor-driven power steering system, wherein a characteristic of the steering system is variously changed by use of a virtual steering model to predict steering performance, whereby development efficiency of steering control technology is improved.

In various aspects of the present invention, there is provided a steering control method of a motor-driven power steering system, the steering control method including: setting, by a controller, a virtual steering model including a reaction force apparatus provided between a steering wheel and a rack gear; inducing, by the controller, a state equation for the virtual steering model, the state equation representing momentum of the steering wheel, the reaction force apparatus, and the rack gear as state variables of the state equation; determining, by the controller, target steering torque acting in the reaction force apparatus through numerical integration of the state equation; and feedback-controlling, by the controller, a steering motor control amount to the motor-driven power steering system to bring a steering torque of the motor-driven power steering system into agreement with the target steering torque.

In the virtual steering model, a steering angle speed and a rack force may be applied as input variables of the virtual steering model; inertia of a steering wheel, rigidity of a torsion bar used as the reaction force apparatus, a torsion bar damper, column friction, a pinion radius, and weight of the rack gear may be applied as system characteristic parameters of the virtual steering model; and the target steering torque determined by relations of the input variables of the virtual steering model with the system characteristic parameters of the virtual steering model may be applied as an output variable of the virtual steering model.

The state equation for the virtual steering model may be induced by use of a bond graph.

The state equation may be induced by setting twisting displacement of the torsion bar, rack gear momentum, steering wheel momentum, and rack gear displacement as state variables of the state equation.

The target steering torque may be determined by an equation presented below.

$$T_{q\_ref} = K_t \times q_5 + B_t \times \dot{q}_5$$

Tq_ref: Target steering torque
Kt: Rigidity of torsion bar
q5: Twisting displacement of torsion bar
Bt: Damping constant of Torsion bar damper
$\dot{q}_5$: Differential value of twisting displacement of torsion bar.

An assist gain may be multiplied to the target steering torque, and the target steering torque may be changeable according to the assist gain presented by an equation.

Here, 0<assist gain (Ka)≤1.

The target steering torque may be changeable by changing at least one of the system characteristic parameters of the virtual steering model.

A steering control apparatus of the present invention may include: a setting portion setting the virtual steering model having the reaction force apparatus provided between the steering wheel and the rack gear; a determining portion determining the target steering torque acting in the reaction force apparatus through numerical integration of the state equation after inducing the state equation for the virtual steering model, the state equation representing momentum of the steering wheel, the reaction force apparatus, and the rack gear as state variables of the state equation; and a feedback controller feedback-controlling the steering motor control amount to bring the steering torque into agreement with the target steering torque.

According to an exemplary embodiment of the present invention, the target steering torque (Tq_ref) is determined on the basis of the virtual steering model (VM) by the above-described means to solve problems, whereby steering performance is predicted to increase development efficiency of steering control technology, and a characteristic of the steering system is variously changed to generate various types of steering feel, so that tuning efficiency is improved.

Furthermore, when applied to an SBW system, which has no mechanical connection structure between the steering wheel and a steering gear box, the present invention allows the SBW system to generate a steering reaction force and steering feel like the SBW system has a mechanical steering system similar to the mechanical connection structure provided therebetween.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1A:
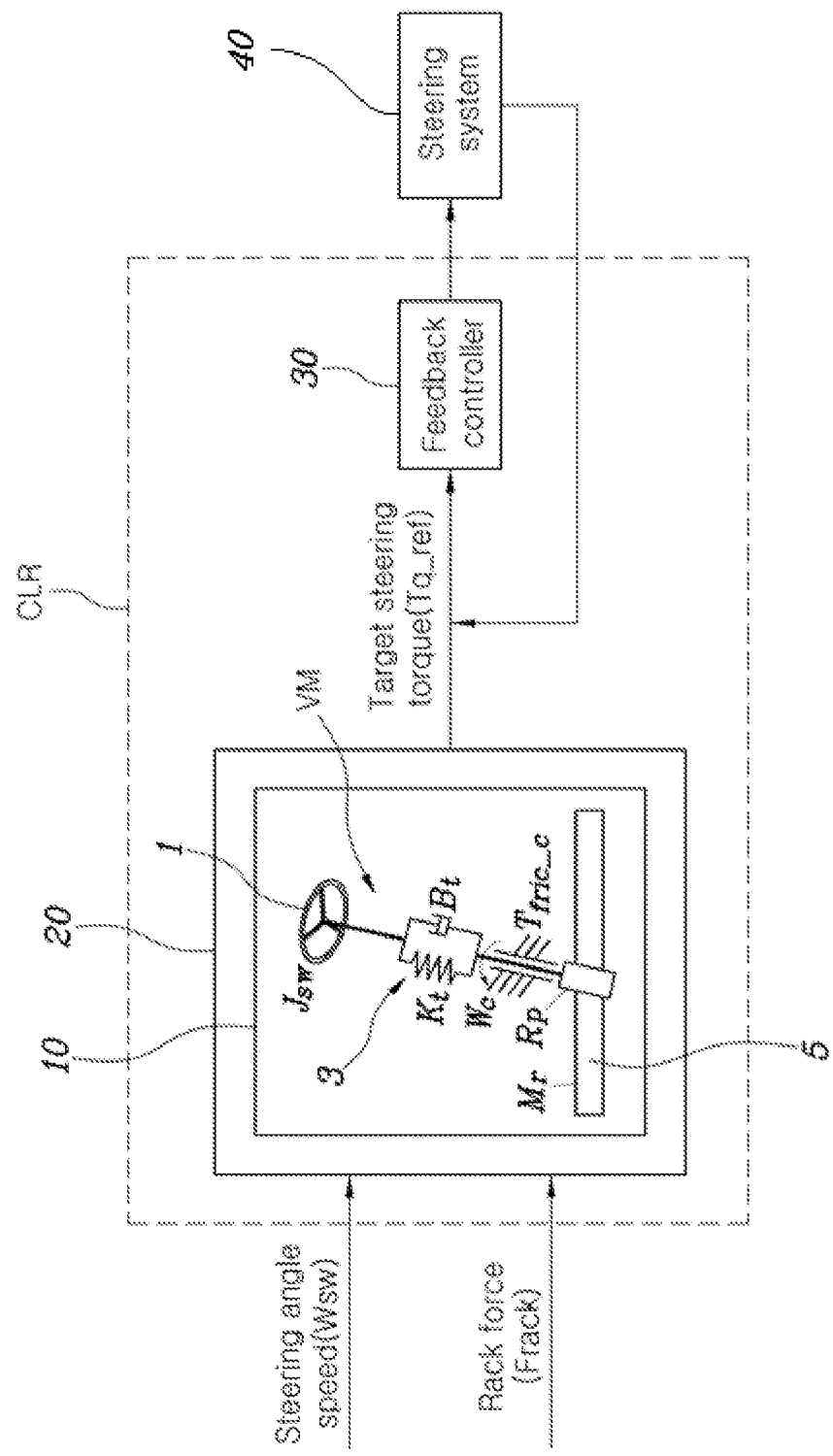
FIG. 1A is a block diagram illustrating a configuration of a steering control apparatus according to an exemplary embodiment of the present invention and FIG. 1B is a bond graph for a state equation induced for a virtual steering model of FIG. 1A.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Hereinbelow, an exemplary embodiment of the present invention will be described in detail with reference to the accompanying drawings.

A motor-driven power steering system applicable to an exemplary embodiment of the present invention may be the motor-driven power steering system, which generates or supports a steering force by use of a motor, and the steering system may be a motor-driven power steering (MDPS) system or a steer-by-wire (SBW) system.

Meanwhile, The present invention relates to a steering control method configured for variously changing target steering torque (Tq_ref) by being applied to the steering system, the steering control method including: setting a virtual steering model, inducing a state equation for the virtual steering model, determining the target steering torque by use of the state equation, and feedback-controlling a steering motor control amount to the motor-driven power steering system to bring steering torque into agreement with the target steering torque.

Figure 2:
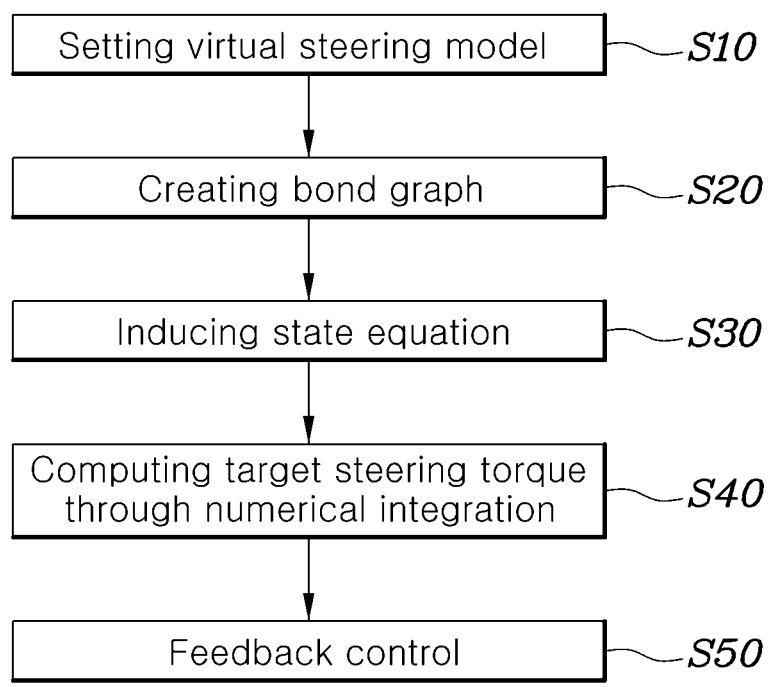
FIG. 2 is a flowchart showing a flow of a steering control process according to an exemplary embodiment of the present invention.

To describe the present invention in detail referring to FIG. 1A and FIG. 2, first, in the setting, a controller (CLR) sets the virtual steering model (VM) having a reaction force apparatus provided between a steering wheel 1 and a rack gear 5. Here, the reaction force apparatus may be a torsion bar 3 and the controller may set the virtual steering model (VM) having the torsion bar 3 connected between the steering wheel 1 and the rack gear 5.

Next, in the inducing, the controller (CLR) induces the state equation for the virtual steering model (VM), the state equation representing momentum of the steering wheel 1, the reaction force apparatus, and the rack gear 5 as state variables of the state equation.

Next, in the determining, the controller (CLR) determines the target steering torque (Tq_ref) operating in the reaction force apparatus through numerical integration of the state equation.

Next, in the feedback controlling, the controller (CLR) feedback-controls the steering motor control amount to bring the steering torque into agreement with the target steering torque (Tq_ref).

That is, according to an exemplary embodiment of the present invention, the target steering torque (Tq_ref) is determined on the basis of the virtual steering model (VM), whereby steering performance is predicted to increase development efficiency of steering control technology, and a characteristic of the steering system is variously changed to generate various types of steering feel, so that tuning efficiency is improved.

Furthermore, when applied to the SBW system, which has no mechanical connection structure between the steering wheel 1 and a steering gear box, the present invention allows the SBW system to generate a steering reaction force and steering feel as if the SBW system had a mechanical steering system similar to the mechanical connection structure.

Furthermore, referring to FIG. 1A, to describe the virtual steering model (VM) according to an exemplary embodiment of the present invention, in the virtual steering model (VM), a steering angle speed ($\omega$sw) and a rack force (Frack) may be applied as input variables of the virtual steering model; inertia of the steering wheel 1, rigidity (Kt) of the torsion bar used as the reaction force apparatus, a damping constant of torsion bar damper (Bt), a rotation speed of torsion bar (Wc), a driver steering torque (T_in), a column friction of a lower portion of the torsion bar (Tfric_c), a column friction of an upper portion of the torsion bar (Tfric_sw), a pinion radius (Rp), and weight (Mr) of the rack gear may be applied as system characteristic parameters of the virtual steering model; and the target steering torque (Tq_ref) determined by relations of the input variables of the virtual steering model with each of the system characteristic parameters of the virtual steering model may be applied as an output variable of the virtual steering model.

That is, the virtual steering model (VM) may be set by use of two input variables of the virtual steering model, six parameters, and one output variable of the virtual steering model.

Figure 1B:
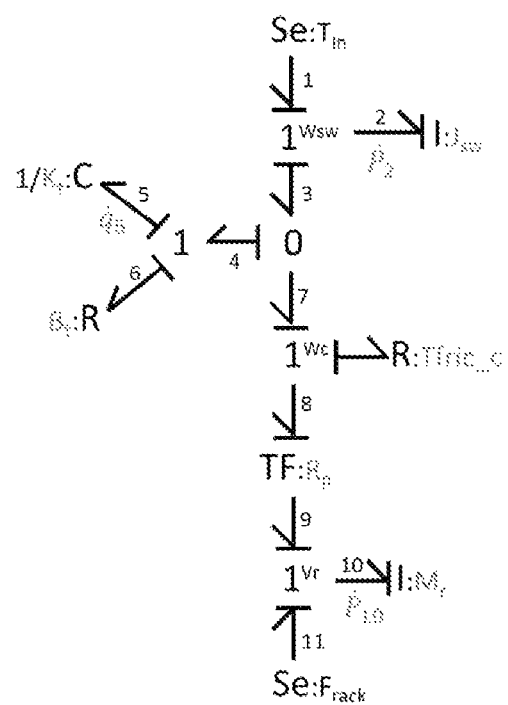

Meanwhile, the state equation may be induced for the virtual steering model (VM) by use of a bond graph, and the bond graph may be expressed in FIG. 1B as an example below.

Each notation shown in FIG. 1B which illustrates a bond graph for a state equation induced for a virtual steering model of FIG. 1A, is denoted as follows.

ωsw: Steering angle speed
Frack: Rack force
Jsw: Inertia of a steering wheel
Kt: Torsion bar rigidity
Bt: Torsion bar damper
Tfric_c: Column friction of a lower part of the torsion bar
Rp: Pinion radius
Mr: Weight of rack gear Furthermore, the bond graph is used to induce the state equation, and the state equation may be induced by setting the twisting displacement q5 of the torsion bar, rack gear momentum P10, steering wheel momentum P2, and rack gear displacement q13 as state variables of the state equation. An example of the state equation may be expressed as described below.

$$\frac{d}{dt}\begin{bmatrix} q_5 \\ P_{10} \\ P_2 \\ q_{13} \end{bmatrix} = \begin{bmatrix} 0 & -\frac{1}{R_p M_r} & \frac{1}{J_{sw}} & 0 \\ \frac{K_t}{R_p} & -\frac{B_t}{R_p^2 M_r} & \frac{B_t}{R_p J_{sw}} & 0 \\ -K_t & \frac{B_t}{R_p M_r} & -\frac{B_t}{J_{sw}} & 0 \\ 0 & \frac{1}{M_r} & 0 & 0 \end{bmatrix} \begin{bmatrix} q_5 \\ P_{10} \\ P_2 \\ q_{13} \end{bmatrix} + \begin{bmatrix} 0 \\ 0 \\ 1 \\ 0 \end{bmatrix}$$

$$T_{in} + \begin{bmatrix} 0 \\ 1 \\ 0 \\ 0 \end{bmatrix} F_{rack} + \begin{bmatrix} 0 \\ -\frac{1}{R_p} \\ 0 \\ 0 \end{bmatrix} T_{fric\_c} + \begin{bmatrix} 0 \\ 0 \\ -1 \\ 0 \end{bmatrix} T_{fric\_sw}$$

q5: Twisting displacement of torsion bar
P10: Rack gear momentum
P2: Steering wheel momentum
q13: Rack gear displacement Furthermore, according to an exemplary embodiment of the present invention, as described above, the target steering torque (Tq_ref) operating in the torsion bar 3 is determined through the numerical integration of the state equation, and the target steering torque (Tq_ref) may be determined by an equation (1) below.

$$T_{q\_ref} = K_t \times q_5 + B_t \times \dot{q}_5 \quad (1)$$

Tq_ref: Target steering torque
Kt: Torsion bar rigidity
q5: Twisting displacement of torsion bar
Bt: Torsion bar damper
$\dot{q}_5$: Differential value of twisting displacement of torsion bar Meanwhile, according to an exemplary embodiment of the present invention, an assist gain (Ka) is multiplied to the target steering torque (Tq_ref) determined by the equation, and the target steering torque (Tq_ref) may be changed according to the assist gain (Ka). An equation (2) may be presented as below.

$$T_{q\_ref} = K_a \times (K_t \times q_5 + B_t \times \dot{q}_5) \quad (2)$$

Here, 0<the assist gain (Ka)≤1.

That is, when a value of the target steering torque (Tq_ref) determined by the equation (1) is excessively high, the target steering torque (Tq_ref) may be decreased by applying the assist gain (Ka).

Figure 3:
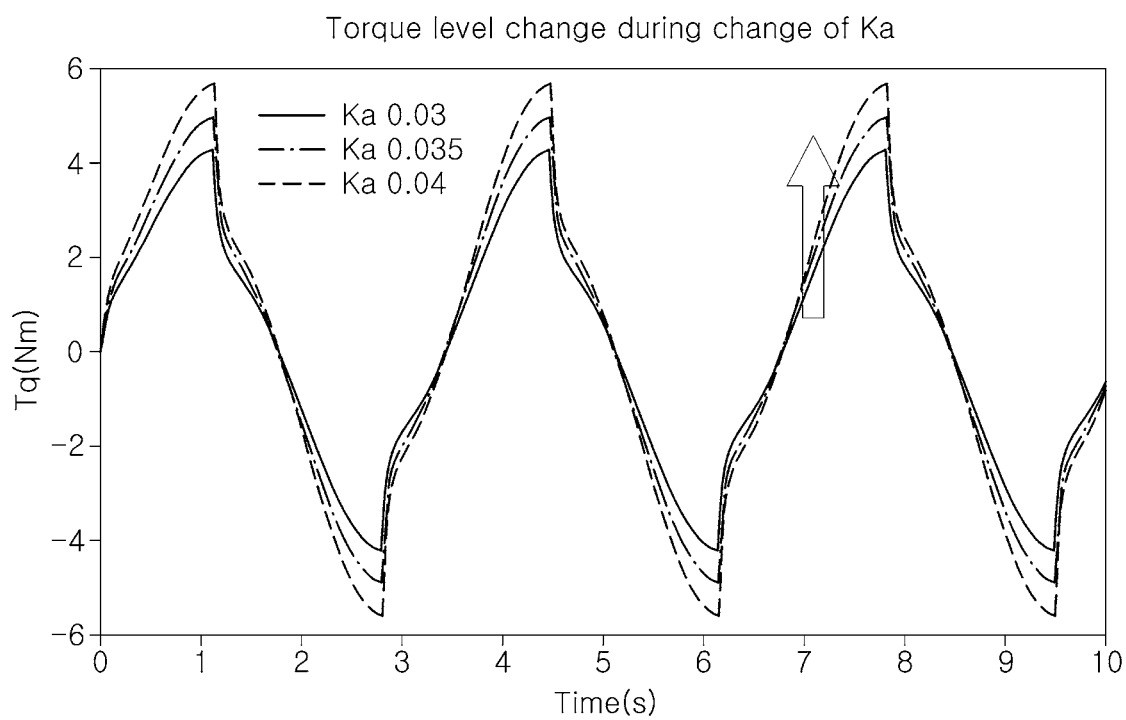
FIG. 3 is a graph showing an experimental result where target steering torque changes according to an assist gain in an exemplary embodiment of the present invention.

However, as shown in FIG. 3, during the application of the assist gain (Ka), the target steering torque (Tq_ref) may be determined in proportion to magnitude of the assist gain (Ka), and when the assist gain (Ka) increases, the target steering torque (Tq_ref) increases.

Furthermore, the present invention may be configured to allow the target steering torque (Tq_ref) to be changed by modifying at least any one of the system characteristic parameters of the virtual steering model.

Figure 4:
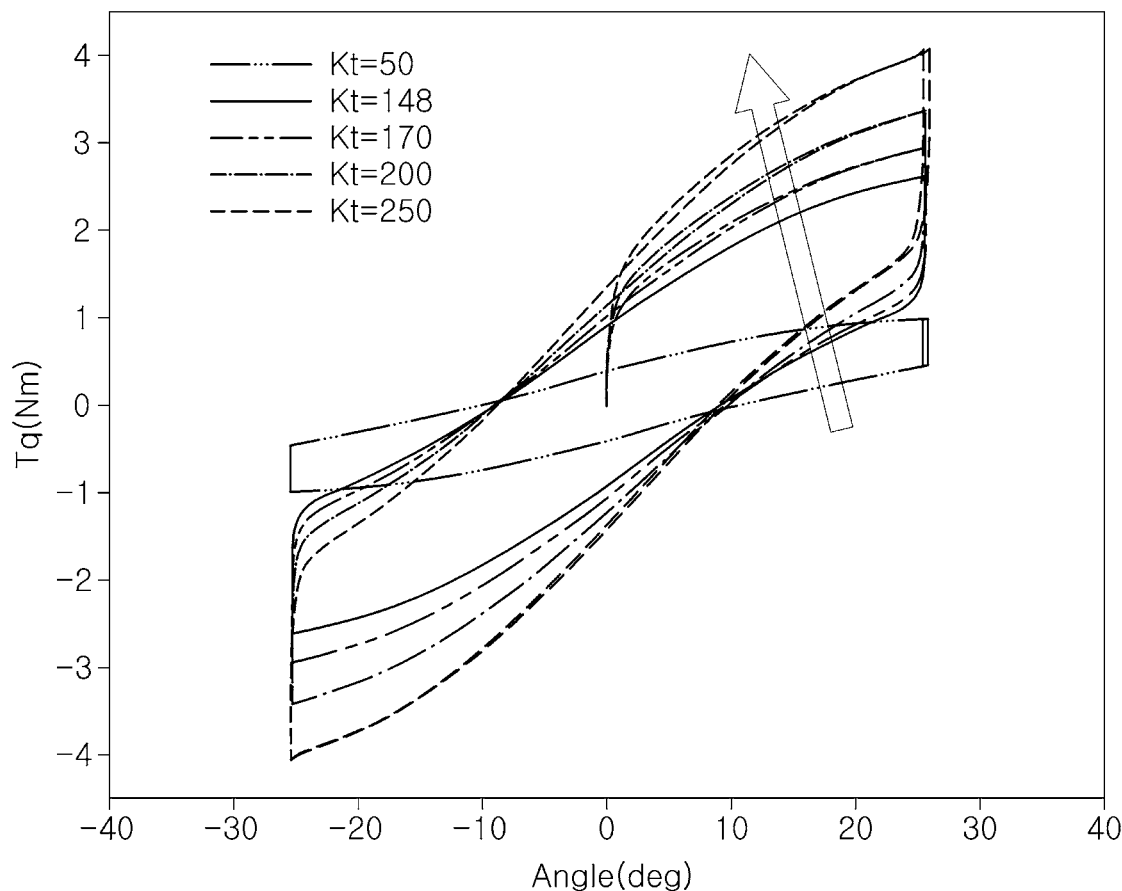
FIG. 4 is a graph showing an experimental result where the target steering torque changes according to rigidity of a torsion bar in an exemplary embodiment of the present invention.

That is, FIG. 4 is a graph showing an experimental result that the target steering torque (Tq_ref) changes according to the rigidity (Kt) of a torsion bar. When the rigidity (Kt) of the torsion bar increases, the target steering torque (Tq_ref) increases.

Figure 5:
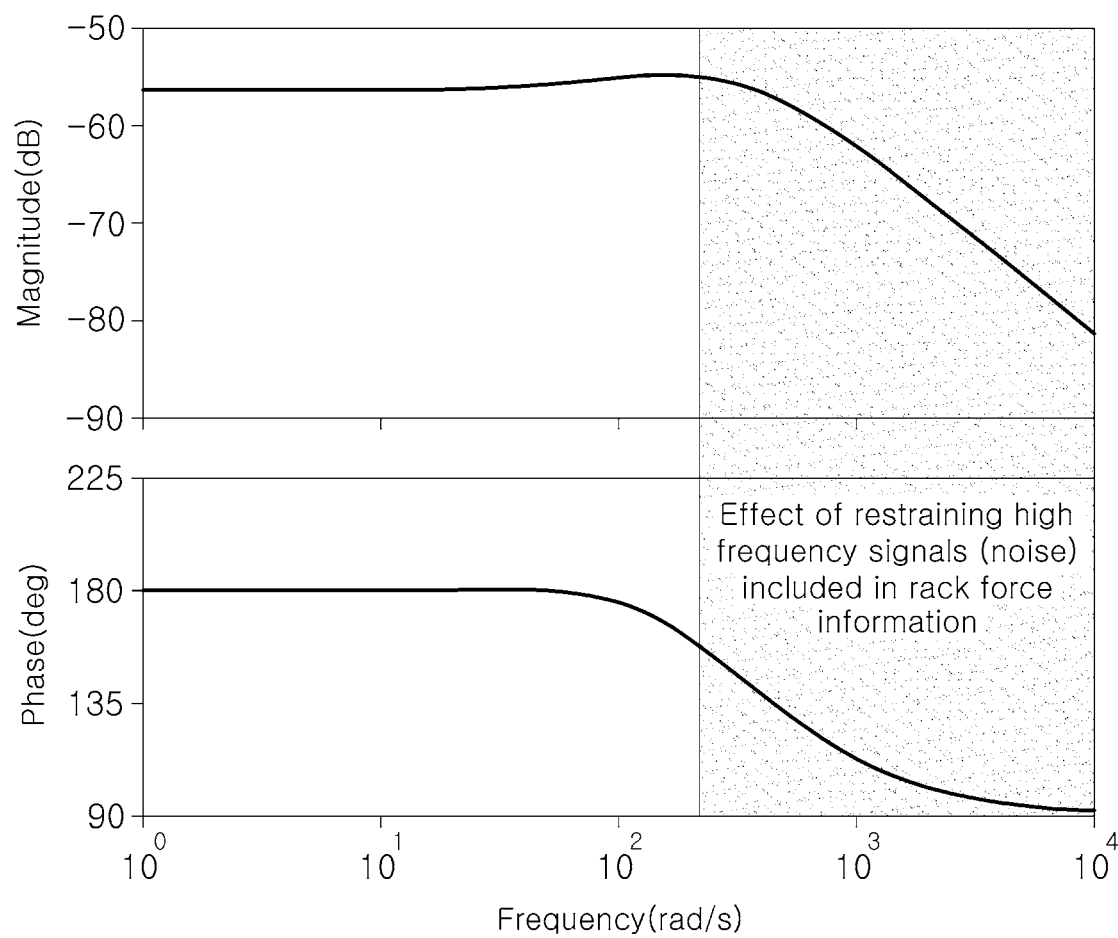
FIG. 5 is a graph showing magnitudes and phases of frequency signals included in rack force information in an exemplary embodiment of the present invention.

Furthermore, FIG. 5 is a graph showing magnitudes and phases of frequency signals included in rack force information, and it is identified that high frequency signals included in the rack force information may be restrained.

That is, a frequency domain may be mapped out according to the target steering torque (Tq_ref), whereby outside noise may be restrained.

Figure 6:
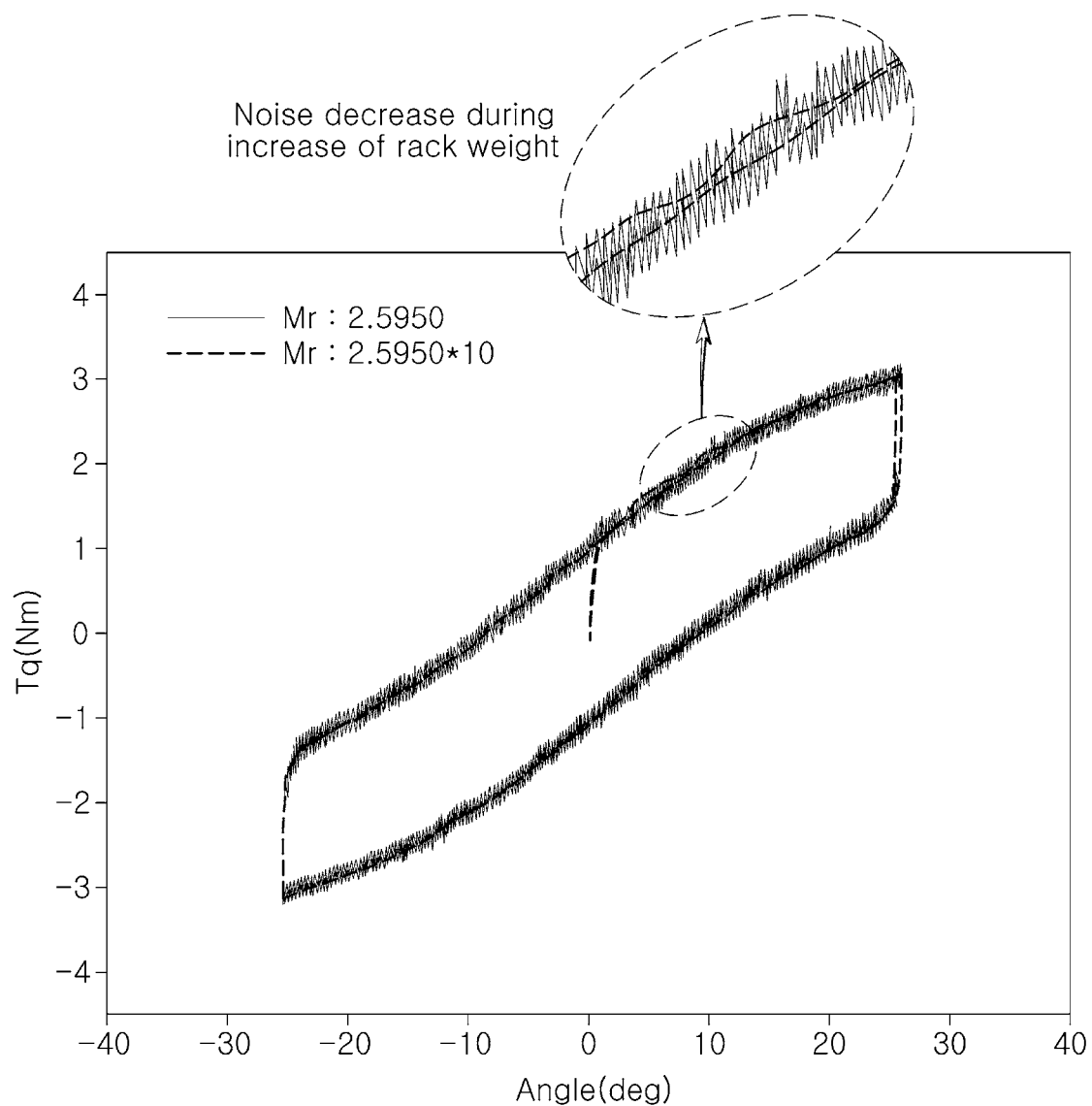
FIG. 6 is a graph showing an experimental result where noise decreases according to weight of a rack gear in an exemplary embodiment of the present invention.

For example, as weight of the rack gear 5 increases, inertia increases, and accordingly, noise may be decreased due to energy absorption (a filter effect). This may be verified through an experimental result that noise decreases according to the weight (Mr) of the rack gear in FIG. 6.

Accordingly, according to an exemplary embodiment of the present invention, characteristics of system parameters such as the rigidity (Kt) of the torsion bar and the weight (Mr) of the rack gear are changed to generate various types of steering feel, whereby steering performance may be predicted, so that development efficiency of the steering control technology and tuning efficiency are improved.

Meanwhile, a steering control apparatus of the motor-driven power steering system according to an exemplary embodiment of the present invention may include a setting portion 10, a determining portion 20, and a feedback controller 30.

Referring to FIG. 1A, first, the setting portion 10 sets and stores the virtual steering model (VM) having the reaction force apparatus provided between the steering wheel 1 and the rack gear 5.

Furthermore, the determining portion 20 determines the target steering torque (Tq_ref) operating in the reaction force apparatus through the numerical integration of the state equation after inducing the state equation for the virtual steering model (VM), the state equation including the momentum of the steering wheel 1, the reaction force apparatus, and the rack gear 5 as state variables of the state equation.

Furthermore, the feedback controller 30 feedback-controls the steering motor control amount to bring the steering torque into agreement with the target steering torque (Tq_ref).

Meanwhile, FIG. 2 is a flowchart showing a flow of a steering control process in using the steering control apparatus of FIG. 1A. To describe the flow of the steering control process referring to FIG. 2, first, the virtual steering model (VM) including the steering wheel 1, the rack gear 5, and the torsion bar 3 is set at S10.

Next, the bond graph is generated for the virtual steering model (VM) at S20, and the state equation is induced by use of the bond graph. The state equation is induced by setting the twisting displacement q5 of the torsion bar, the rack gear momentum P10, the steering wheel momentum P2, and the rack gear displacement q13 as state variables of the state equation at S30.

Next, the target steering torque (Tq_ref) operating in the torsion bar 3 is determined through the numerical integration of the state equation at S40.

Next, the steering motor control amount is feedback-controlled to the motor-driven power steering system 40 to bring the steering torque measured by a torque sensor into agreement with the target steering torque (Tq_ref) at S50.

As described above, according to an exemplary embodiment of the present invention, the target steering torque (Tq_ref) is determined on the basis of the virtual steering model (VM), whereby steering performance is predicted to increase development efficiency of the steering control technology, and a characteristic of the steering system may be variously changed to generate various types of steering feel, so that tuning efficiency is improved.

Furthermore, when applied to the SBW system, which has no mechanical connection structure between the steering wheel 1 and a steering gear box, the present invention allows the SBW system to generate a steering reaction force and steering feel like the SBW system has a mechanical steering system similar to the mechanical connection structure provided therebetween.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A steering control method of a motor-driven power steering system, the steering control method comprising:
    setting, by a controller, a virtual steering model including a reaction force apparatus provided between a steering wheel and a rack gear;
    inducing, by the controller, a state equation for the virtual steering model, the state equation representing momentum of the steering wheel, the reaction force apparatus, and the rack gear as state variables of the state equation;
    determining, by the controller, a target steering torque acting in the reaction force apparatus through numerical integration of the state equation; and
    feedback-controlling, by the controller, a steering motor control amount of the motor-driven power steering system to bring a steering torque of the motor-driven power steering system into agreement with the target steering torque,
    wherein, in the virtual steering model,
        a steering angle speed and a rack force are applied as input variables of the virtual steering model;
        inertia of a steering wheel, rigidity of the reaction force apparatus, a damping constant of the reaction force apparatus, a column friction of the reaction force apparatus, a pinion radius, and weight of the rack gear are applied as system characteristic parameters of the virtual steering model; and
        the target steering torque determined by relations of the input variables of the virtual steering model with the system characteristic parameters of the virtual steering model to form the state equation, is applied as an output variable of the virtual steering model,
    wherein the reaction force apparatus is a torsion bar, the damping constant of the reaction force apparatus is a damping constant of the torsion bar, and the column friction of the reaction force apparatus is a column friction of the torsion bar, and
    wherein the target steering torque is determined by an equation of $$T_{q\_ref} = K_t \times q_5 + B_t \times \dot{q}_5$$

Tq_ref: Target steering torque
    Kt: Rigidity of torsion bar
    q5: Twisting displacement of torsion bar
    Bt: damping constant of torsion bar damper
    $\dot{q}_5$: Differential value of twisting displacement of torsion bar.

2. The steering control method of claim 1, wherein the state equation for the virtual steering model is induced by use of a bond graph.

3. The steering control method of claim 1, wherein the state equation is induced by setting twisting displacement of the torsion bar, rack gear momentum, steering wheel momentum, and rack gear displacement as the state variables of the state equation.

4. A steering control method of a motor-driven power steering system, the steering control method comprising:
    setting, by a controller, a virtual steering model including a reaction force apparatus provided between a steering wheel and a rack gear;
    inducing, by the controller, a state equation for the virtual steering model, the state equation representing momentum of the steering wheel, the reaction force apparatus, and the rack gear as state variables of the state equation;
    determining, by the controller, a target steering torque acting in the reaction force apparatus through numerical integration of the state equation; and
    feedback-controlling, by the controller, a steering motor control amount of the motor-driven power steering system to bring a steering torque of the motor-driven power steering system into agreement with the target steering torque,
    wherein, in the virtual steering model,
        a steering angle speed and a rack force are applied as input variables of the virtual steering model;
        inertia of a steering wheel, rigidity of the reaction force apparatus, a damping constant of the reaction force apparatus, a column friction of the reaction force apparatus, a pinion radius, and weight of the rack gear are applied as system characteristic parameters of the virtual steering model to form the state equation; and the target steering torque determined by relations of the input variables of the virtual steering model with the system characteristic parameters of the virtual steering model is applied as an output variable of the virtual steering model, wherein the reaction force apparatus is a torsion bar, the damping constant of the reaction force apparatus is a damping constant of the torsion bar, and the column friction of the reaction force apparatus is a column friction of the torsion bar, and wherein the target steering torque is determined by an equation of $$T_{q\_ref}=K_a \times (K_t \times q_5 + B_t \times \dot{q}_5)$$

Tq_ref: Target steering torque
Ka: Assist gain
Kt: Rigidity of torsion bar
q5: Twisting displacement of torsion bar
Bt: Damping constant of Torsion bar damper
$\dot{q}_5$: Differential value of twisting displacement of torsion bar.

5. The steering control method of claim 4, wherein the target steering torque (Tq_ref) is changeable according to the assist gain which is greater than zero and less than or equal to 1.

6. The steering control method of claim 1, wherein the target steering torque is changeable by changing at least one of the system characteristic parameters of the virtual steering model.

7. A steering control apparatus of a motor-driven power steering system, the steering control apparatus comprising:

a setting portion setting a virtual steering model including a reaction force apparatus provided between a steering wheel and a rack gear;

a determining portion determining a target steering torque acting in the reaction force apparatus through numerical integration of a state equation after inducing the state equation for the virtual steering model, the state equation representing momentum of the steering wheel, the reaction force apparatus, and the rack gear as state variables of the state equation; and a feedback controller feedback-controlling a steering motor control amount to the motor-driven power steering system to bring a steering torque of the motor-driven power steering system into agreement with the target steering torque, wherein in the virtual steering model, a steering angle speed and a rack force are applied as input variables of the virtual steering model;

inertia of a steering wheel, rigidity of the reaction force apparatus, a damping constant of the reaction force apparatus, a column friction of the reaction force apparatus, a pinion radius, and weight of the rack gear are applied as system characteristic parameters of the virtual steering model to form the state equation; and the target steering torque determined by relations of the input variables of the virtual steering model with the system characteristic parameters of the virtual steering model is applied as an output variable of the virtual steering model, wherein the reaction force apparatus is a torsion bar, the damping constant of the reaction force apparatus is a damping constant of the torsion bar, and the column friction of the reaction force apparatus is a column friction of the torsion bar, and wherein the target steering torque (Tq_ref) is determined by an equation of $$T_{q\_ref}=K_t \times q_5 + B_t \times \dot{q}_5,$$

Tq_ref: Target steering torque
Kt: Rigidity of torsion bar
q5: Twisting displacement of torsion bar
Bt: Damping constant of Torsion bar damper
$\dot{q}_5$: Differential value of twisting displacement of torsion bar.

8. The steering control apparatus of claim 7, wherein the state equation for the virtual steering model is induced by use of a bond graph.

9. The steering control apparatus of claim 7, wherein the state equation is induced by setting twisting displacement of the torsion bar, rack gear momentum, steering wheel momentum, and rack gear displacement as the state variables of the state equation.

10. A steering control apparatus of a motor-driven power steering system, the steering control apparatus comprising:

a setting portion setting a virtual steering model including a reaction force apparatus provided between a steering wheel and a rack gear;

a determining portion determining a target steering torque acting in the reaction force apparatus through numerical integration of a state equation after inducing the state equation for the virtual steering model, the state equation representing momentum of the steering wheel, the reaction force apparatus, and the rack gear as state variables of the state equation; and a feedback controller feedback-controlling a steering motor control amount to the motor-driven power steering system to bring a steering torque of the motor-driven power steering system into agreement with the target steering torque, wherein in the virtual steering model, a steering angle speed and a rack force are applied as input variables of the virtual steering model;

inertia of a steering wheel, rigidity of the reaction force apparatus, a damping constant of the reaction force apparatus, a column friction of the reaction force apparatus, a pinion radius, and weight of the rack gear are applied as system characteristic parameters of the virtual steering model to form the state equation; and the target steering torque determined by relations of the input variables of the virtual steering model with the system characteristic parameters of the virtual steering model is applied as an output variable of the virtual steering model, wherein the reaction force apparatus is a torsion bar, the damping constant of the reaction force apparatus is a damping constant of the torsion bar, and the column friction of the reaction force apparatus is a column friction of the torsion bar, and wherein the target steering torque is determined by an equation of $$T_{q\_ref}=K_a \times (K_t \times q_5 + B_t \times \dot{q}_5),$$

Tq_ref: Target steering torque
Ka: Assist gain
Kt: Rigidity of torsion bar
q5: Twisting displacement of torsion bar
Bt: damping constant of torsion bar damper
$\dot{q}_5$: Differential value of twisting displacement of torsion bar.

11. The steering control apparatus of claim 10, wherein the target steering torque (Tq_ref) is changeable according to the assist gain which is greater than zero and less than or equal to 1.

12. The steering control apparatus of claim 7, wherein the target steering torque is changeable by changing at least one of the system characteristic parameters of the virtual steering model.

13. The steering control method of claim 1, wherein the state equation is determined by an equation of:

$$\frac{d}{dt}\begin{bmatrix} q_5 \\ P_{10} \\ P_2 \\ q_{13} \end{bmatrix} = \begin{bmatrix} 0 & -\frac{1}{R_p M_r} & \frac{1}{J_{sw}} & 0 \\ \frac{K_t}{R_p} & \frac{B_t}{R_p^2 M_r} & \frac{B_t}{R_p J_{sw}} & 0 \\ -K_t & \frac{B_t}{R_p M_r} & -\frac{B_t}{J_{sw}} & 0 \\ 0 & \frac{1}{M_r} & 0 & 0 \end{bmatrix}\begin{bmatrix} q_5 \\ P_{10} \\ P_2 \\ q_{13} \end{bmatrix} + \begin{bmatrix} 0 \\ 0 \\ 1 \\ 0 \end{bmatrix} T_{in} + \begin{bmatrix} 0 \\ 1 \\ 0 \\ 0 \end{bmatrix} F_{rack} +$$

-continued $$\begin{bmatrix} 0 \\ -\frac{1}{R_p} \\ 0 \\ 0 \end{bmatrix} T_{fric\_c} + \begin{bmatrix} 0 \\ 0 \\ -1 \\ 0 \end{bmatrix} T_{fric\_sw}$$

wherein $q_5$ is the twisting displacement of the torsion bar, $P_{10}$ is rack gear momentum, $P_2$ is steering wheel momentum, and $q_{13}$ is rack gear displacement, $J_{sw}$ is the inertia of a steering wheel, $K_t$ is rigidity of torsion bar, $B_t$ is the damping constant of torsion bar damper, $T_{fric\_c}$ is column friction of a lower part of the torsion bar, $R_p$ is the pinion radius, $M_r$ is the weight of rack gear, $T_{in}$ is a driver steering torque, $T_{fric\_sw}$ is a column friction of an upper portion of the torsion bar, and $F_{rack}$ is rack force.

* * * * *